2,660,890

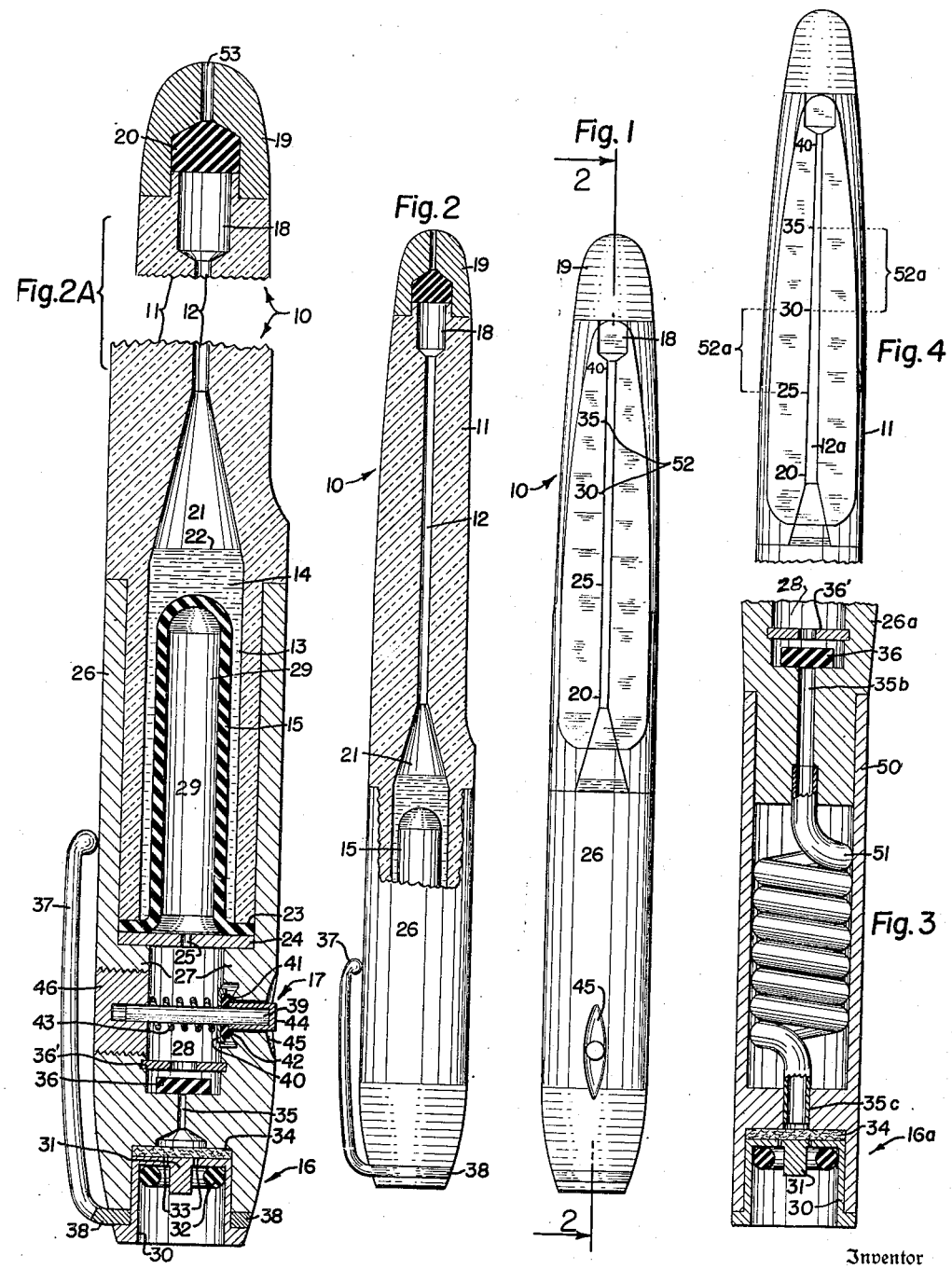
Dec. 1, 1953 — O. F. FLETCHER — 2,660,890
TIRE PRESSURE GAUGE
Filed July 17, 1950
Inventor
ORION F. FLETCHER
By Anderson & Muller
Attorneys Patented Dec. 1, 1953

UNITED STATES PATENT OFFICE 2,660,890

TIRE PRESSURE GAUGE

Orion F. Fletcher, Denver, Colo.

Application July 17, 1950, Serial No. 174,247

2 Claims. (Cl. 73—409)

This invention relates to pressure gages, and more particularly to gages for measuring pressure of pneumatic tires.

One of the objects of the invention is to provide a tire gage of the liquid column type wherein the pressure graduations between predetermined pressure limits may be spread more evenly throughout the length of the gage.

Another object is to render the gage more compact.

Another object is to provide a gage in which the calibrations for pressure difference increments are more uniformly spaced along its length.

Another object is to provide a bleed device to prevent surging and breaking of the liquid column.

Another object is to provide a gage with an extensible deflator device for rendering the gage more readily attachable to relatively inaccessible tire valves.

Further objects are to provide a gage which is simple in construction, readily and economically fabricatable, and highly accurate in operation.

Still further objects, advantages, and salient features will become more apparent from the description to follow, the appended claims, and the accompanying drawing, in which:

Figure 1 is a side elevation of one form of the invention;

Figure 2 is a section taken on line 2—2, Figure 1, portions being shown in side elevation;

Figure 2A is an enlarged section taken on line 2—2, Figure 1, a portion being broken out;

Figure 3 is a longitudinal section of an alternative form of deflator which may be employed with any form of the invention disclosed; and Figure 4 is an alternative form of liquid column tube which may be employed with any form of the invention.

Referring in detail to the drawing, and particularly Figures 1, 2 and 2A, the gage 10 comprises, in general, a transparent tube 11 having a small bore 12 extending longitudinally thereof, a chamber 13 containing a liquid 14, an expansible tubular diaphragm 15 disposed within the liquid chamber, a deflator and check valve assembly 16, and an air pressure release valve device 17.

Tube 11 may be of any suitable transparent material, such as the synthetic plastics now in common use. The tube is provided with an enlarged air chamber 18 communicating with the upper end of bore 12, the chamber being closed at its upper end by a cap 19 cemented or otherwise affixed to tube 11 and a body of self-sealing rubber 20 interposed between the cap and upper end of the air chamber. The lower end of the bore communicates with liquid chamber 13 which is provided with a frusto-conical air chamber 21 disposed between the lower end of bore 12 and the upper level 22 of the liquid 14.

Diaphragm 15 is formed as a tubular sack of rubber, plastic, or other resilient material and is disposed within reservoir 13, its lower end being provided with a circular flange 23, one side of which abuts the lower edge of the tube 11, the other side abutting a disk 24, the latter having a small bleed port 25 therein.

A sleeve 26 surrounds tube 11 in sealing engagement therewith and is provided with an annular abutment 27 which abuts the lower surface of the disk. When the parts are assembled leakage of liquid or air around the edge of flange 23 is precluded.

To permit air from a pneumatic tire to enter air chambers 28, 29 a deflator 16 is provided, this device comprising a cup-shaped member 30 adapted to surround the end of a tire valve stem and having a projection 31 which engages the tire valve core and opens it. A rubber seal ring 32 engages the end of the tire valve stem and prevents leakage, the air passing through one or more holes 33, through a felt filter pad 34, through bore 35, around check valve disk 36 and thence into chambers 28, 29. The check valve just referred to may be a flat disk of rubber-like material or any other suitable type of check valve. The disk shown is retained from excessive movement away from its seat by a snap ring 36'. A pocket clip 37, similar to those employed on fountain pens, is secured to the device by an integral ring member 38 on the clip disposed between the lower end of sleeve 26 and cup member 30.

To permit release of air pressure in chambers 28, 29, a release valve 17 is employed, this valve comprising a valve stem 39 having a cup member 40 containing an annular rubber seal ring 41 engageable with valve seat 42. A spring 43 urges the seal ring against seat 42 and the valve may be moved away from its seat by an actuator 44 affixed to the valve stem, the outer exposed end of the actuator being substantially flush with sleeve 26 and a groove 45 being provided into which a nail of a finger, such as the thumbnail, may move when the valve is opened. When opened, air from chambers 28, 29 discharges through clearance space around the actuator. To facilitate fabrication of the valve seat, assembly of the parts, and to form a guide for valve stem 39, a plug 46 is provided in sleeve 26, this being cemented or otherwise secured to prevent air leakage.

In Figure 3 is illustrated an alternative form of deflator which may be employed with tire valves which are relatively inaccessible, such as on dual tire trucks, etc. In this construction the lower end of sleeve 26a is provided with a removable sleeve 50 which contains a coil of resilient tubing 51, one end of which is connected to bore 35b and the other end to bore 35c connecting with deflator 16a. It will be apparent that the construction of Figure 3 is the same as in the figures previously described except that the deflator may be extended from the gage as the coils of tubing are pulled out of sleeve 50. This tubing may be of any resilient material, such as certain plastics, which will automatically resume their nested position in tubing 51 when sleeve 50 is replaced on sleeve 26a.

In the operation of the invention so far described, the deflator is applied to the tire valve stem, air enters chamber 28, passes through bleed port 25 and into chamber 29 expanding tubular diaphragm 15 forcing the liquid into bore 12, and compressing air thereabove, the pressure being read on graduations 52. The purpose of providing air chamber 21 is to shorten the overall length of the gage, since by having a chamber of larger cross section than the bore 12, and hence a greater volume per unit length thereof, the lowest desired graduation, such as say twenty pounds per square inch, may be disposed near the lower end of bore 12. If this enlarged air chamber were not provided it is apparent that the liquid would be forced a considerable distance along bore 12 to read a similar pressure, thus requiring a longer tube. Air chamber 18 is also advantageous since it spreads a range of pressures such as between twenty and forty pounds, as shown in Figure 1, over a longer distance, thus making the gage more sensitive and easier to read accurately, this being due to the greater quantity of air which is compressed above the liquid column. It will be apparent that if chamber 18 were omitted, other proportions being the same, the forty pound graduation would be closer to the twenty pound graduation, and hence the spread between graduations per unit length of the bore would be less.

The graduations per unit difference in pressure are, of course, not equal, which has been illustrated in Figure 1, the graduations becoming closer together toward the upper end of the bore. To render them more equal, the construction shown in Figure 4 may be employed wherein bore 12a is tapered, being larger at the bottom than at the top. With this construction, by proper choice of cross sectional taper the calibrations may be disposed equal or substantially equal distances apart, as shown at 52a, Figure 4.

It will be apparent that after the deflator has been applied to the tire valve stem the pressure in chambers 28, 29 will be the same as in the tire. When the deflator is removed from the valve stem, check valve 36 will close and thus trap air in such chambers and the gage may be removed and read at leisure. When it is desired to return the liquid to its normal position actuator 44 is depressed, thus reducing the pressure in chambers 28, 29 to atmospheric pressure. The purpose of bleed port 25 is to permit air to enter chamber 29 slowly, thus obviating surging of the liquid column in bore 12. Also, it permits the air to be exhausted slowly permitting the liquid column to descend gradually and without breaking of the column and necessitating jarring or shaking it down in the bore in a manner similar to the operation required in clinical thermometers.

While the gage may be calibrated in any manner, it is preferred to calibrate it with a slight pressure in the bore to slightly collapse diaphragm 15. To attain this, liquid 14 is added to reservoir 13 and into bore 12 above the lowermost graduation, that is, above the twenty pound graduation. Cap 19 is then applied and sealed to tube 10. A hypodermic needle is then inserted through bore 53 and seal 20 and the deflator applied to a source of pressure which is exactly twenty pounds per square inch. Air is forced into bore 12 with the needle until the liquid is depressed to the twenty pound mark, after which the needle is removed, the self-sealing material 20 sealing the needle hole therein as it is withdrawn. Bore 53 is then permanently closed with a suitable plug. When the pressure is released the liquid level falls to a position in chamber 21 and the diaphragm 15 will be partially collapsed.

Any suitable liquid may be employed; however, ethylene glycol has the advantage that it will withstand low temperatures without freezing and has been found to give satisfactory results. Any suitable dye may also be employed to render the liquid column clearly visible and the tube 10 need not be clearly transparent, but only transparent to the extent that the liquid column may be clearly visible. Colored material for the tube is therefore contemplated within the purview of "transparent" as hereinafter set forth in the claims.

Having described the invention, what I claim as new is:

1. A tire gage comprising, an elongated transparent member having a relatively long bore extending longitudinally thereof, means comprising a plug-like member of rubber having self sealing properties closing one end of the bore, the other end being of enlarged diameter forming a liquid chamber, an elongated tubular diaphragm extending into the liquid chamber, means forming a seal between the end of the tubular member and the open end of the diaphragm whereby a closed chamber is formed for the liquid which surrounds the tubular diaphram, whereby when the tubular diaphragm is expanded in response to internal pressure some of the surrounding liquid will be displaced and move into that part of the bore of smaller diameter compressing air therein and increasing the air pressure, whereby the distance that the liquid moves into that portion of the bore of smaller diameter will correspond to the pressure in the tubular diaphragm.

2. A device in accordance with claim 1 in which means is operatively associated with the open end of the tubular diaphragm for effecting a communication between a chamber containing a fluid under pressure and the interior of the tubular diaphragm.

ORION F. FLETCHER.

References Cited in the file of this patent

UNITED STATES PATENTS

| Number | Name | Date |
| --- | --- | --- |
| 1,041,336 | Olsen | Oct. 15, 1912 |
| 1,055,827 | Spencer | Mar. 11, 1913 |
| 1,424,461 | Frankforter | Aug. 1, 1922 |
| 1,590,141 | Weaver | June 22, 1926 |
| 1,692,360 | Wolcott et al. | Nov. 20, 1928 |
| 1,933,103 | Farley | Oct. 31, 1933 |
| 2,122,243 | Bonhard | June 28, 1938 |

FOREIGN PATENTS

| Number | Country | Date |
| --- | --- | --- |
| 111,685 | Germany | July 2, 1900 |
| 346,584 | Italy | Feb. 22, 1937 |
| 850,775 | France | Sept. 18, 1939 |